United States Patent
Cho et al.

(10) Patent No.: US 12,534,144 B2
(45) Date of Patent: Jan. 27, 2026

(54) SERVING ROBOT APPARATUS

(71) Applicant: SAMSUNG ELECTRONICS CO., LTD., Suwon-si (KR)

(72) Inventors: Jaemyung Cho, Suwon-si (KR); Donghan Koo, Suwon-si (KR); Sanghyun Kang, Suwon-si (KR); Hyunsuk Kwak, Suwon-si (KR); Minhee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/144,486

(22) Filed: May 8, 2023

(65) Prior Publication Data
US 2023/0271658 A1 Aug. 31, 2023

Related U.S. Application Data

(63) Continuation of application No. PCT/KR2021/019948, filed on Dec. 27, 2021.

(30) Foreign Application Priority Data

Jan. 29, 2021 (KR) ........................ 10-2021-0013671

(51) Int. Cl.
*B62D 63/04* (2006.01)
*B25J 5/00* (2006.01)
(Continued)

(52) U.S. Cl.
CPC .............. *B62D 63/04* (2013.01); *B25J 5/007* (2013.01); *B25J 11/008* (2013.01); *B25J 19/023* (2013.01)

(58) Field of Classification Search
CPC ......... B62D 63/04; B25J 5/007; B25J 11/008; B25J 19/023
See application file for complete search history.

(56) References Cited

U.S. PATENT DOCUMENTS 9,074,808 B2 7/2015 Kim et al.
10,045,829 B1 * 8/2018 Norman .............. A61M 5/1417
(Continued)

FOREIGN PATENT DOCUMENTS

CN 107838930 A 3/2018
JP 2020-40761 A 3/2020
(Continued)

OTHER PUBLICATIONS

International Search Report (PCT/ISA/210) issued Apr. 13, 2022 by the International Searching Authority in counterpart International Patent Application No. PCT/KR2021/019948.
(Continued)

*Primary Examiner* — Saul Rodriguez
*Assistant Examiner* — Ashley K Romano
(74) *Attorney, Agent, or Firm* — Sughrue Mion, PLLC (57) ABSTRACT

A serving robot apparatus is disclosed. The serving robot apparatus includes: a main body; a first driving device which moves the main body; a first sidewall and a second sidewall which are supported by the main body and are arranged so that one surfaces thereof face each other; a plurality of guide rails which are respectively arranged on one surface of the first sidewall in the horizontal direction and are spaced apart from one another in the vertical direction; a plurality of link members of which end portions are connected to one surface of the second sidewall so as to be rotatable on the horizontal plane; a plurality of plates each having one side connected to the intermediate region of each guide rail and the other side connected to the other side of each link member; and a second driving device which respectively rotates the plurality of link members so that the plurality of plates respectively move along the plurality of guide rails.

17 Claims, 11 Drawing Sheets

(51) Int. Cl.
  *B25J 11/00*   (2006.01)
  *B25J 19/02*   (2006.01)

(56) References Cited

U.S. PATENT DOCUMENTS

| | | | |
|---|---|---|---|
| 10,597,270 B2 | 3/2020 | High et al. | |
| 10,674,855 B2 | 6/2020 | Rosalia et al. | |
| 11,185,992 B2 | 11/2021 | Ko | |
| 11,370,123 B2 | 6/2022 | Lee | |
| 11,540,627 B2* | 1/2023 | Jung | A47B 31/00 |
| 11,559,886 B2 | 1/2023 | Kim | |
| 11,660,758 B2* | 5/2023 | Ha | G05D 1/0274 |
| | | | 700/259 |
| 2018/0364870 A1* | 12/2018 | Mei | B25J 5/007 |
| 2019/0105120 A1* | 4/2019 | Norman | A61M 5/1417 |
| 2019/0185266 A1 | 6/2019 | Mattern et al. | |
| 2019/0352092 A1 | 11/2019 | Zheng et al. | |
| 2020/0206946 A1* | 7/2020 | Bondaryk | B66F 9/20 |
| 2020/0223632 A1 | 7/2020 | Melanson et al. | |
| 2020/0290208 A1 | 9/2020 | Ha et al. | |
| 2020/0290217 A1* | 9/2020 | Chernyak | B25J 9/106 |
| 2021/0212455 A1 | 7/2021 | Jung et al. | |

FOREIGN PATENT DOCUMENTS

| | | |
|---|---|---|
| KR | 10-2014-0004308 A | 1/2014 |
| KR | 10-2019-0106904 A | 9/2019 |
| KR | 10-2019-0106910 A | 9/2019 |
| KR | 10-2020-0085658 A | 7/2020 |
| KR | 10-2020-0101056 A | 8/2020 |
| KR | 10-2020-0109235 A | 9/2020 |
| KR | 10-2020-0133174 A | 11/2020 |

OTHER PUBLICATIONS

Written Opinion (PCT/ISA/237) issued Apr. 13, 2022 by the International Searching Authority in counterpart International Patent Application No. PCT/KR2021/019948.

* cited by examiner

SERVING ROBOT APPARATUS

CROSS-REFERENCE TO RELATED APPLICATION(S)

This application is a Bypass Continuation Application of PCT International Application No. PCT/KR2021/019948, filed on Dec. 27, 2021, which is based on and claims priority to Korean Patent Application No. 10-2021-0013671, filed on Jan. 29, 2021, in the Korean Intellectual Property Office, the disclosure of which are incorporated by reference herein in their entireties.

BACKGROUND

1. Field

This disclosure relates to a serving robot apparatus and, more specifically, to a serving robot apparatus capable of doing optimized driving as a plate supporting a subject of serving is withdrawn from a main body to the left or right.

2. Description of Related Art

According to the development of robot technology, the development of a robot for delivering a subject for serving (for example, food) to a designated location at a restaurant or the like is conducted. However, when tables in a restaurant are arranged at a narrow interval, a motion such as a rotation of a robot moving between tables is limited so as not to collide with the table.

In addition, if the robot arriving at a target table may serve only in a specific direction, there may be a problem in that the robot needs to move out of a narrow passage to a wide place to serve to an opposite table, rotate, and re-enter the passage after the rotation, and thus the robot needs to drive in an inefficient route for an excessively long time.

SUMMARY

Additional aspects will be set forth in part in the description which follows and, in part, will be apparent from the description, or may be learned by practice of the presented embodiments.

The disclosure is based on the necessity described above and the purpose of the disclosure is to provide a serving robot apparatus capable of doing optimized driving as a plate supporting a subject for serving is withdrawn from a main body to the left or right.

A serving robot apparatus may include a main body; a first driving device to move the main body; a first sidewall and a second sidewall supported by the main body and having one surface disposed to face each other; a plurality of guide rails horizontally disposed on one surface of the first sidewall and spaced apart from each other in a vertical direction; a plurality of link members of which one end is rotatably connected to one surface of the second sidewall on a horizontal surface; a plurality of plates each having one side connected to the intermediate region of each guide rail and the other side connected to the other end of each link member from the second sidewall; and a second driving device which respectively rotates the plurality of link members so that the plurality of plates respectively move along the plurality of guide rails.

The link member may include a first link of which one end is rotatably connected to the second sidewall, and a second link which is slidably connected to the first link and of which the other end is connected to the plate.

The second link may be disposed on an upper side of the first link and a other end may be connected to a lower surface of the plate.

The serving robot apparatus may further include a support member of which an upper surface is attached to a lower surface of the plate and a lower surface that is disposed to face the first link.

The support member may be disposed side by side with the guide rail.

The second sidewall may have a width smaller than width of the first sidewall.

The serving robot apparatus may further include a plurality of guide blocks respectively connected to the other sides of the plurality of plates and movable along the plurality of guide rails respectively.

The guide block may have a width not less than 0.1 times and not more than 0.4 times of the guide rail.

The plurality of plates may include a first plate and a second plate disposed below the first plate, and the main body may include a base plate horizontally disposed on the lower side of the second plate.

The serving robot apparatus may further include a processor configured to, based on location information and plate information being input by a user, control the first driving device to move the main body to a location corresponding to the location information, and control the second driving device to move at least one of the plurality of plates based on the plate information.

The plurality of plates may include a first plate; and a second plate disposed below the first plate, and the processor may, based on identifying that the plate information corresponds to the second plate, control the second driving device so that the first plate moves in a first direction and the second plate moves in a second direction opposite to the first direction.

The main body may include a base plate horizontally disposed on the lower side of the second plate, and the processor may, based on identifying that the plate information corresponds to the base plate, control the second driving device so that the first plate and the second plate move in a same direction.

The serving robot apparatus may further include a camera to capture surrounding environment of the serving robot apparatus.

The main body may include a first body to support lower ends of the first and second sidewalls and a second body to support upper ends of the first and second sidewalls.

The serving robot apparatus may further include a display device disposed in the second body.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by the applicant. Unless there is a specific definition of a term, the term may be construed based on the overall contents and technological common sense of those skilled in the related art.

It is to be understood that the terms such as "comprise" or "consist of" may, for example, be used to designate a presence of a characteristic, number, operation, element, component, or a combination thereof, and not to preclude a presence or a possibility of adding one or more of other characteristics.

In the disclosure, components required for the description of each embodiment of the disclosure are described and thus, the embodiment is not necessarily limited thereto. Accordingly, some components may be changed or omitted and other components may be added. In addition, components may be disposed and arranged in different independent devices.

Furthermore, embodiments of the disclosure are described in detail with reference to the accompanying drawings and the contents described in the accompanying drawings, but the disclosure is not restricted or limited by embodiments.

The disclosure will be described in detail with reference to the drawings.

Figure 1:
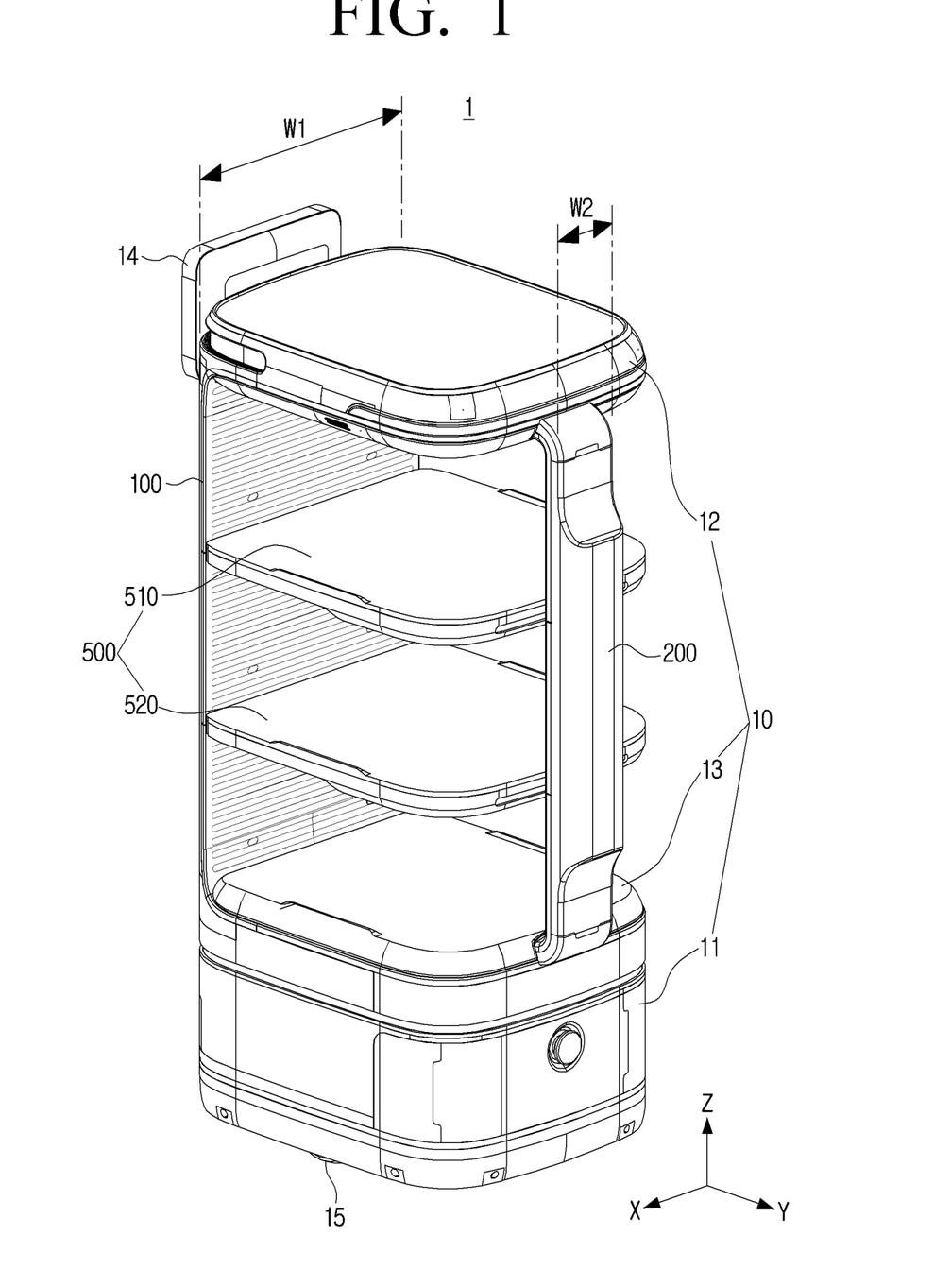
FIG. 1 is a perspective view of a serving robot apparatus according to one or more embodiments of the disclosure.
Figure 2:
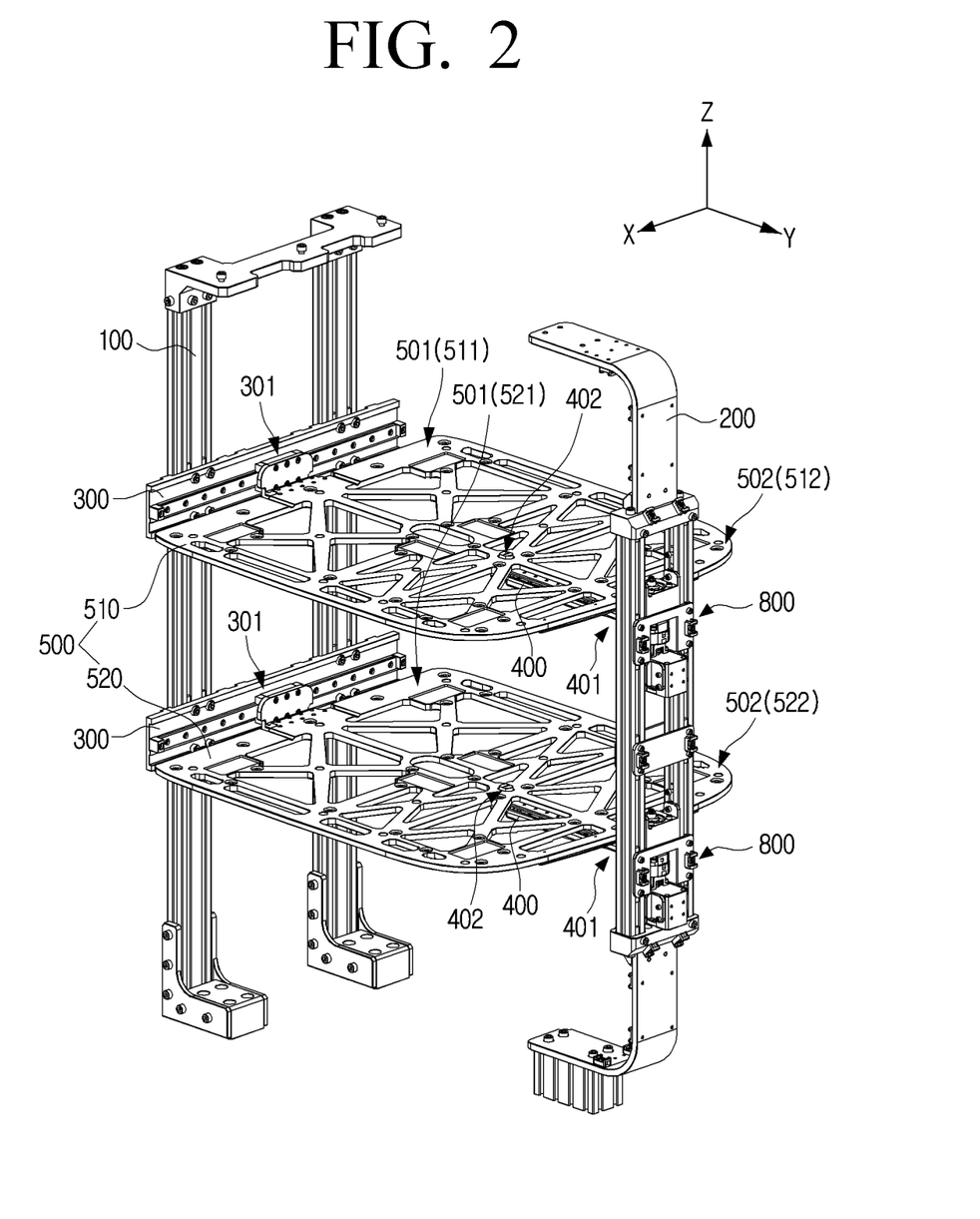
FIG. 2 is a perspective view illustrating a state in which a housing is removed from the serving robot apparatus of FIG. 1.

FIG. 1 is a perspective view of a serving robot apparatus according to one or more embodiments of the disclosure;

FIG. 2 is a perspective view illustrating a state in which a housing is removed from the serving robot apparatus of FIG. 1.

Figure 7:
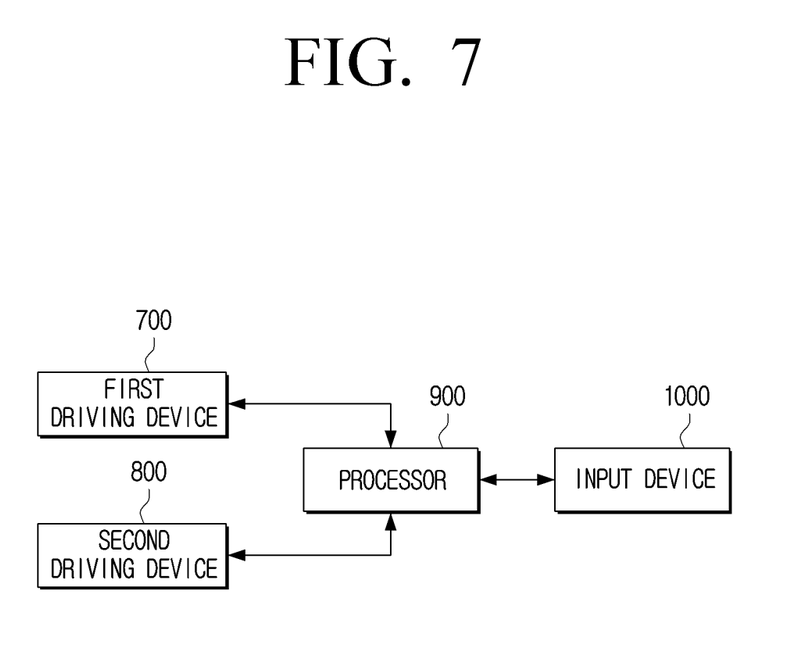
FIG. 7 is a block diagram schematically illustrating a control process of a serving robot apparatus according to one or more embodiments of the disclosure.

Referring to FIG. 1 and FIG. 2, a serving robot apparatus 1 according to one or more embodiments of the disclosure may include a main body 10, a first driving device 700 (FIG. 7), a first sidewall 100, a second sidewall 200, a plurality of guide rails 300, a plurality of link members 400, a plurality of plates 500, and a second driving device 800 (FIG. 7).

The main body 10 may include a first body 11 and a second body 12. The first and second bodies 11, 12 may have a substantially rectangular parallelepiped shape, but the shape is not limited thereto. The first and second bodies 11, 12 may accommodate a plurality of electronic components required for the operation of the serving robot apparatus 1 inside.

The first body 11 may support the lower ends of the first and second sidewalls 100, 200, and the second body 12 may support the upper ends of the first and second sidewalls 100, 200. That is, the first and second sidewalls 100, 200 may be disposed between the first body 11 and the second body 12.

The first and second sidewalls 100, 200 may be stably supported in a vertical direction by the first and second bodies 11, 12.

The first and second bodies 11, 12 may face each other. Specifically, the upper surface of the first body 11 and the lower surface of the second body 12 may face each other. In addition, the first and second bodies 11, 12 may have the same cross-sectional area in the horizontal direction. The first and second bodies 11, 12 may be disposed a distance away that is equal to the length of the first and second sidewalls 100, 200.

The serving robot apparatus 1 may further include a display device 14 disposed on the second body 12. The display device 14 may provide an image including information related to serving. For example, the display device 14 may display a target table to which the serving robot apparatus 1 is to move and information on the plate 500 corresponding to the target table.

The serving robot apparatus 1 may further include a camera (not shown) capturing environment around the serving robot apparatus 1. The serving robot apparatus 1 may recognize surrounding environment based on information collected by the camera, may do autonomous driving and information collection and may transmit information to a user.

The first driving device 700 may move the main body 10. That is, the first driving device 700 may rotate a plurality of wheels 15 disposed on a lower surface of the first body 11 and move the main body 10 to a preset location. Accordingly, the serving robot apparatus 1 may move the subject for serving to a designated location.

The first driving device 700 may include a motor, a battery, an actuator, a gear, a bearing, or the like, and may be accommodated in the first body 11. The first driving device 700 may be disposed at a lower portion of the first body 11.

The first sidewall 100 and the second sidewall 200 are supported by the main body 10 and have one surface facing each other. One surface of the first and second sidewalls 100, 200 facing each other may be an inner surface of the first and second sidewalls.

The first and second sidewalls 100, 200 may have the same heights. Accordingly, the first and second bodies 10, 20 are spaced apart from each other with a preset interval in a vertical direction and may be arranged in a line with each other.

The second sidewall 200 may have a smaller width than the first sidewall 100. That is, the width W2 of the second sidewall 200 may be smaller than the width W1 of the first sidewall 100. For example, the width W2 of the second sidewall 200 may be 0.1 times or more and 0.4 times or less of the width W1 of the first sidewall 100, but the numerical value is not limited thereto.

That is, the first sidewall 100 may have a sufficiently long width W1 to stably support the horizontally elongated guide rail 300, and the second sidewall 200 may have a sufficiently small width W2 to allow the plate 500 to be maximally exposed at the outside. Accordingly, since interference between the subject for serving and the first and second sidewalls 100 and 200 is minimized, the user may place the subject for serving on the upper surface of the plate 500 or easily pick up the subject for serving placed on the plate 500.

The first and second sidewalls 100, 200 may have a shape of a plate having a length in a vertical direction longer than a length in a horizontal direction. Further, as shown in FIG. 2, the first and second sidewalls 100, 200 may include a frame structure implemented with two side-by-side columns within the housing.

A plurality of guide rails 300 may be horizontally arranged on one surface of the first sidewall 100 and may be spaced apart from each other in a vertical direction. The guide rail 300 may provide a moving route in a horizontal direction of the plate 500. To be specific, the guide rail 300 may guide the plate 500 linearly along an X axis direction.

One end 401 of the plurality of link members 400 may be rotatably connected to one surface of the second sidewall 200 on a horizontal surface. Accordingly, the plurality of link members 400 may rotate within a preset angle range on the X-Y horizontal plane with respect to a Z-axis passing through the second sidewall 200.

The link member 400 may be formed with the same number of the guide rail 300, and may be located at the same height with the guide rail 300. The link member 400 may have a shape of a straight line.

A plurality of plates 500 may have one side 501, 511, 521 connected to an intermediate region 301 of a plurality of guide rails 300, respectively, and the other side 502, 512, 522 may be connected to the other end 402 of the plurality of link members 400, respectively.

The plurality of plates 500 may be disposed between the first and second sidewalls 100, 200, and may have a shape of a plate having a substantially rectangular cross-section. Since the plurality of plates 500 are horizontally arranged without being inclined, a subject for serving placed on the upper surface may be stably supported.

The plurality of plates 500 may be formed to be the same number as the guide rail 300 and the plurality of link members 400.

The plurality of plates 500 may include a first plate 510 and a second plate 520. The second plate 520 may be disposed below the first plate 510 by a vertical distance. However, the number of the plurality of plates 500 is not limited to two, and three or more plates may be formed.

In addition, the main body 10 may include a base plate 13 arranged on the lower side of the plurality of plates 500. Specifically, the base plate 13 may be horizontally disposed on the lower side of the second plate 520 and may have the same horizontal cross-sectional area as the first and second plates 510, 520.

The base plate 13 may be fixedly disposed on the upper surface of the first body 11 without moving in the horizontal direction unlike the first and second plates 510, 520. A user may place a subject for serving on the top surface of the base plate 13 as well as the first and second plates 510, 520.

That is, the serving robot apparatus 1 may have a total of three layers consisting of first and second plates 510, 520 and the base plate 13. However, since the number of the plurality of plates 500 is not limited to two, the serving robot apparatus 1 may have a structure of four or more layers.

The second driving device 800 may rotate the plurality of link members 400 so that the plurality of plates 500 move along the plurality of guide rails 300, respectively. Specifically, when the second driving device 800 rotates the link member 400 on the horizontal plane, the plate 500 connected to the other end 402 of the link member 400 may receive the rotational force of the link member 400 and move in a specific direction. At this time, since the plate 500 is restricted by the guide rail 300 and the moving direction is guided, the plate 500 may move along the guide rail 300 in a horizontal direction.

Figure 3:
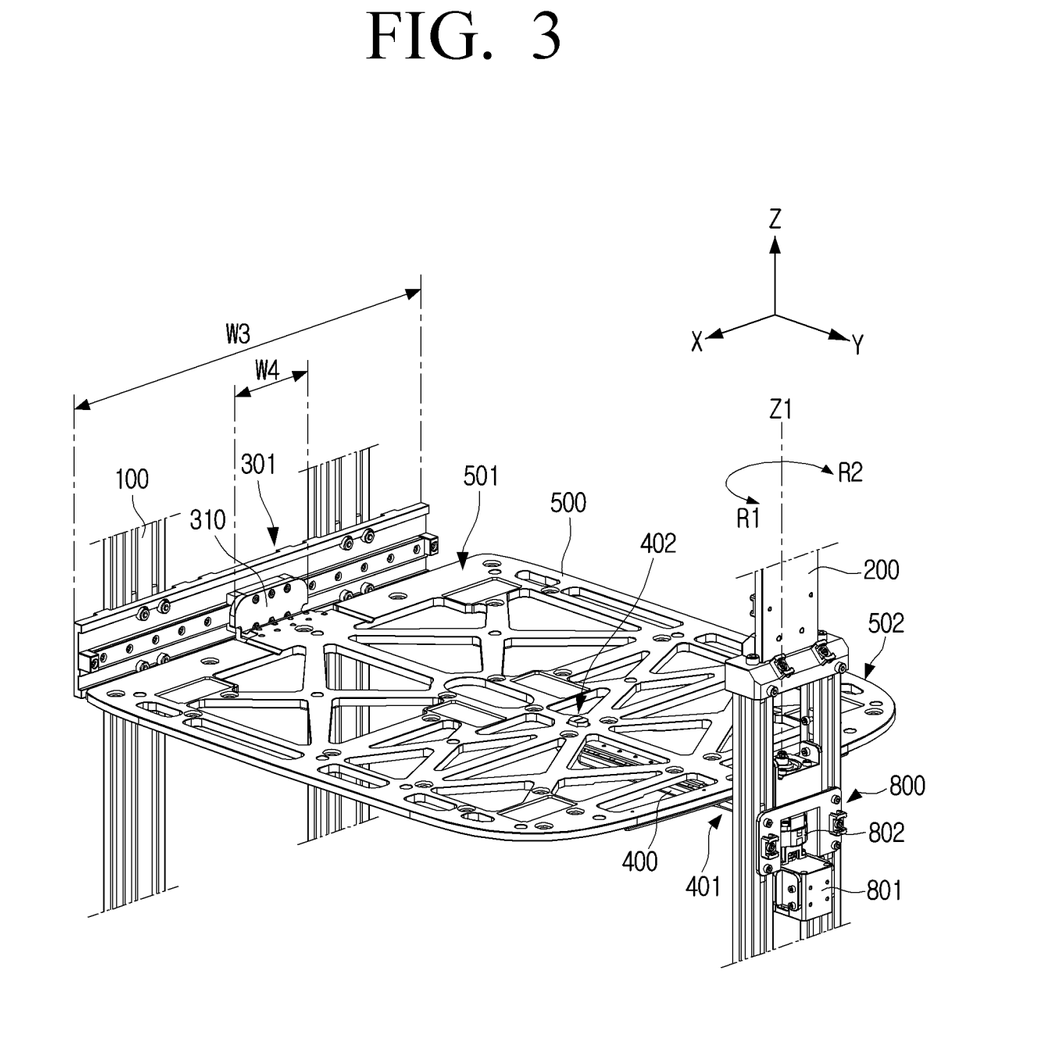
FIG. 3 is a perspective view of the plate inserted into the main body.
Figure 4:
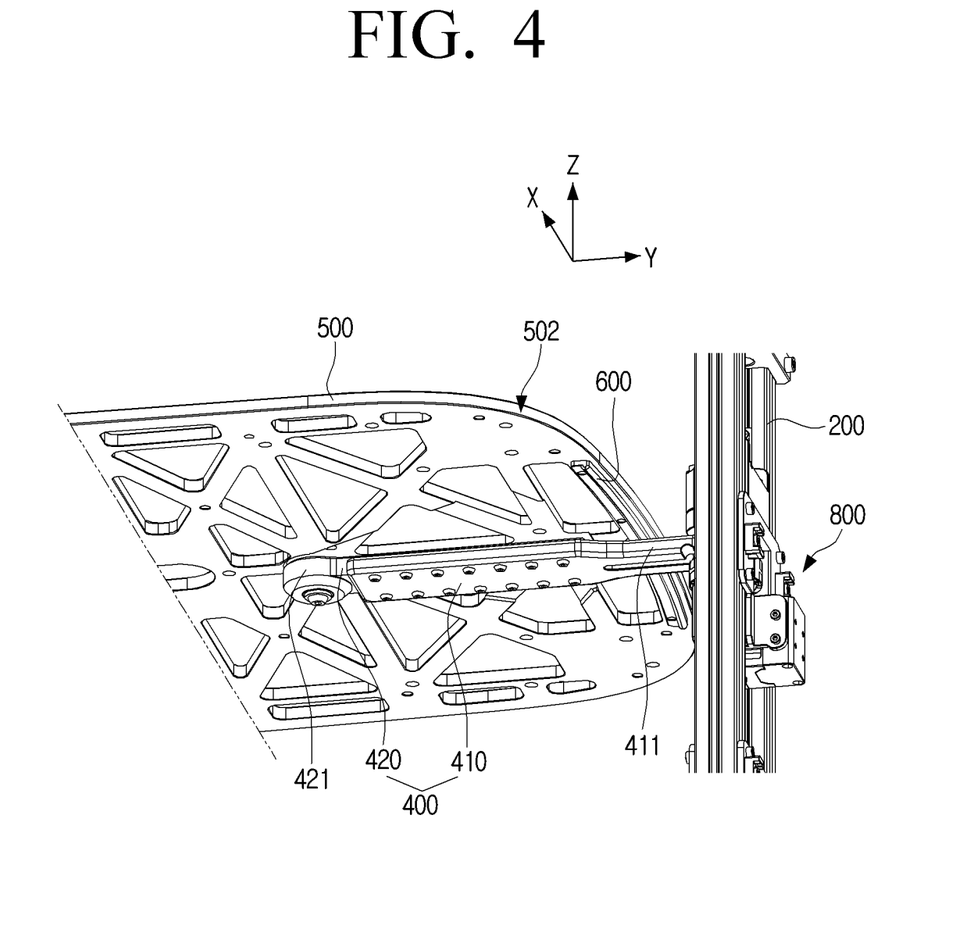
FIG. 4 is a perspective view of a lower surface of the plate of FIG. 3.
Figure 5:
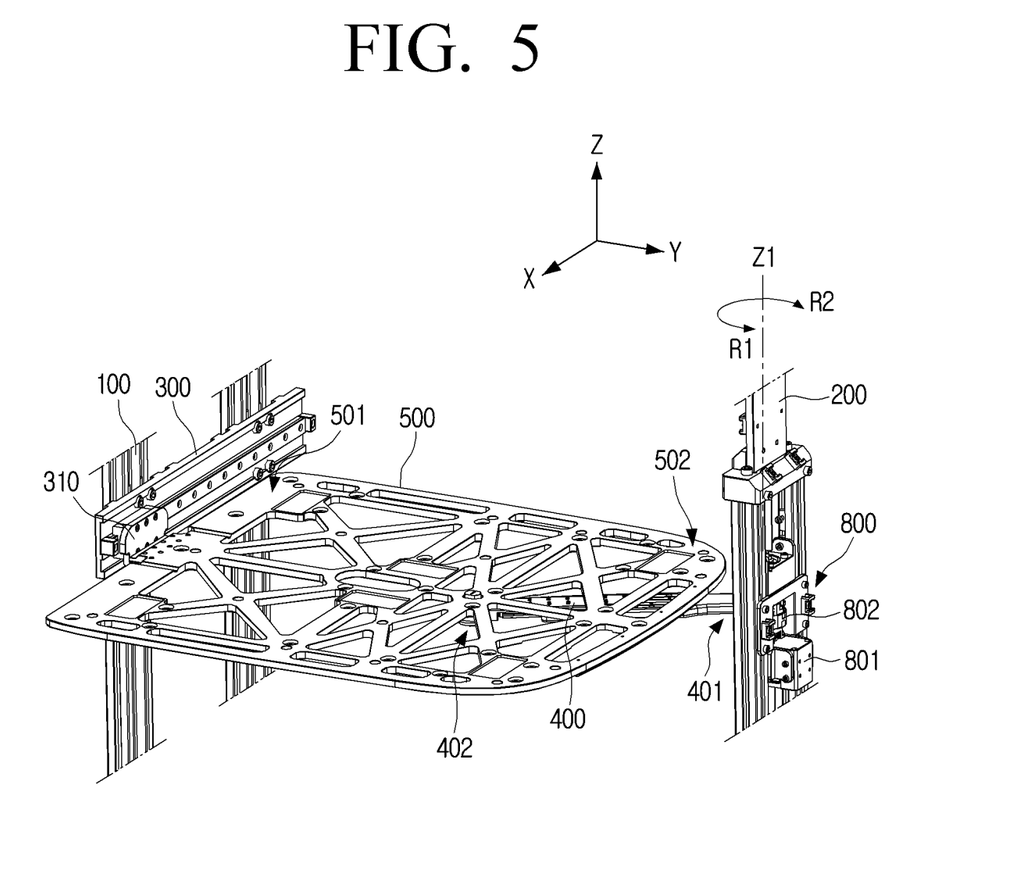
FIG. 5 is a perspective view of the plate protruding out of the body.
Figure 6:
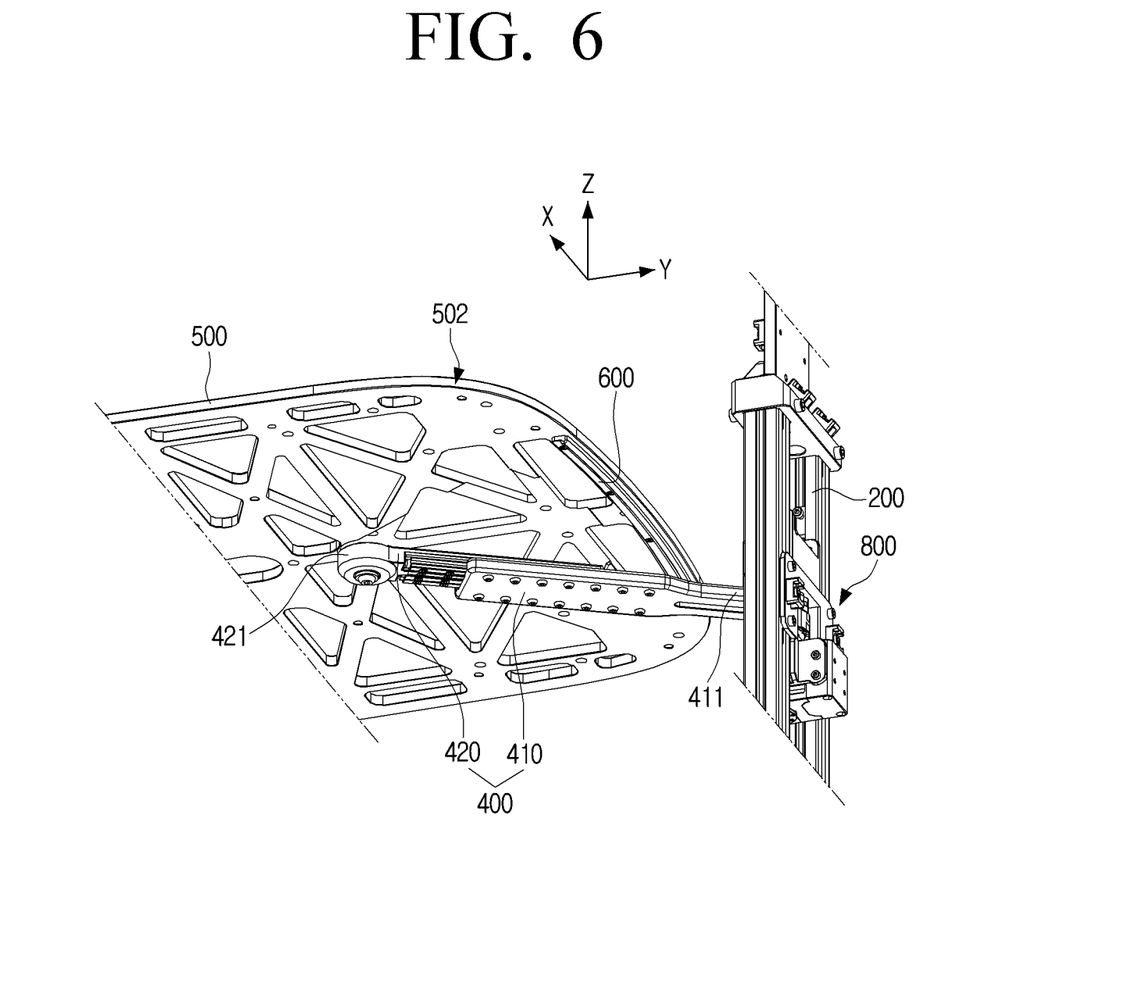
FIG. 6 is a perspective view taken along with the lower surface of the plate of FIG. 5.

FIG. 3 is a perspective view of the plate inserted into the main body; FIG. 4 is a perspective view of a lower surface of the plate of FIG. 3; FIG. 5 is a perspective view of the plate drawn out of the body; FIG. 6 is a perspective view taken along with the lower surface of the plate of FIG. 5.

Referring to FIGS. 3 to 6, the link member 400 may include a first link 410 and a second link 420 sequentially disposed from the second sidewall 200 toward the plate 500.

One end 411 of the first link 410 may be rotatably connected to the second sidewall 200, the second link 420 may be slidably connected to the first link 410, and the other end 421 may be connected to the plate 500.

Specifically, the second link 420 may be disposed above the first link 410, and the other end 421 may be connected to the lower surface of the plate 500. That is, the second link 420 may be disposed closer to the plate 500 than the first link 410, and may move in a direction away from or closer to the second sidewall 200 along the longitudinal direction of the first link 410. Accordingly, the overall length of the link member 400 may vary.

For example, when the driving force of a motor 801 of the second driving device 800 rotates the first and second links 410, 420 in the R1 direction through the reducer 802, the plate 500 connected to the second link 420 may receive the rotational force and move in the +X direction from the intermediate region 301 of the guide rail 300.

On the contrary, when the second driving device 800 rotates the first and second links 410, 420 in the R2 direction, the plate 500 connected to the second link 420 may receive the rotational force and move in the −X direction from the intermediate region 301 of the guide rail 300.

In this case, since a portion of the plate 500 connected to the second link 420 moves away from the second sidewall 200, the second link 420 may be pulled toward the first sidewall by the plate 500. Accordingly, the second link 420 may slide along the longitudinal direction of the first link 410 to move in a direction away from the second sidewall 200, and the entire length of the link member 400 may be lengthened.

That is, when the second driving device 800 rotates the link member 400 connected to the plate 500 in one direction, the length of the link member 400 may be lengthened and the plate 500 may be stably withdrawn to the left or right from the main body 10 along the straight path in the horizontal direction provided by the guide rail 300.

The serving robot apparatus 1 may further include a support member 600 having an upper surface attached to the lower surface of the plate 500 and a lower surface disposed to face the first link 410. A lower surface of the support member 600 may be in contact with the first link 410.

The support member 600 may be arranged in parallel with the guide rail 300 and may be elongated in the moving direction (X-axis direction) of the plate 500. In addition, the thickness of the support member 600 may be constant along the longitudinal direction.

That is, the support member 600 may be disposed between the plate 500 and the first link 410 and may maintain the interval between the plate 500 and the first link 410 as the thickness of the support member 600.

Accordingly, since the plate 500 is stably supported upward by the first link 410 and the support member 600, the other side 502 of the plate 500 is not tilted downward, and the plate 500 may stably move left and right on the horizontal surface. The plate 500 is kept level by the first link 410 thereby allowing objects to be placed on and removed from each plate of the plurality of plates 500.

The serving robot apparatus 1 may further include a plurality of guide blocks 310 respectively connected to the other side 502 of the plurality of plates 500 and movable along the plurality of guide rails 300.

The guide block 310 may connect the plate 500 to the guide rail 300. The guide block 310 may be coupled to the guide rail 300 and may support a lower surface of the plate 500.

The guide block 310 may move along the guide rail 300. Specifically, the guide block 310 is disposed in the intermediate region 301 of the guide rail 300, and may move to the left end or the right end of the guide rail 300 when a preset event occurs and the plate 500 is to be withdrawn. The guide block 310 moves in a the X direction when moving along the guide rail 300.

A width W4 of the guide block 310 may be smaller than a width W3 of the guide rail 300. The guide block 310 may move as much as the width W3 of the guide rail 300 minus the width W4 of the guide block 310. For example, when the width W3 of the guide rail 300 is 300 mm and the width W4 of the guide block 310 is 60 mm, the guide block 310 may move to the left by 120 mm or to the right by 120 mm with the intermediate region 301 of the guide rail 300 as a starting point.

Specifically, the guide block 310 may have a width W4 of 0.1 times or more and 0.4 times or less of the guide rail 300. Accordingly, the guide block 310 may move within a long operating range along a moving section having a sufficiently long length of the guide rail 300.

In addition, since the plate 500 connected to the guide block 310 may move away from the main body 10 sufficiently far away from the main body 10, the plate may be exposed to the outside as much as possible. Accordingly, a user may easily place a subject for serving on the plate 500 or easily pick up a subject for serving placed on the plate 500.

Figure 8:
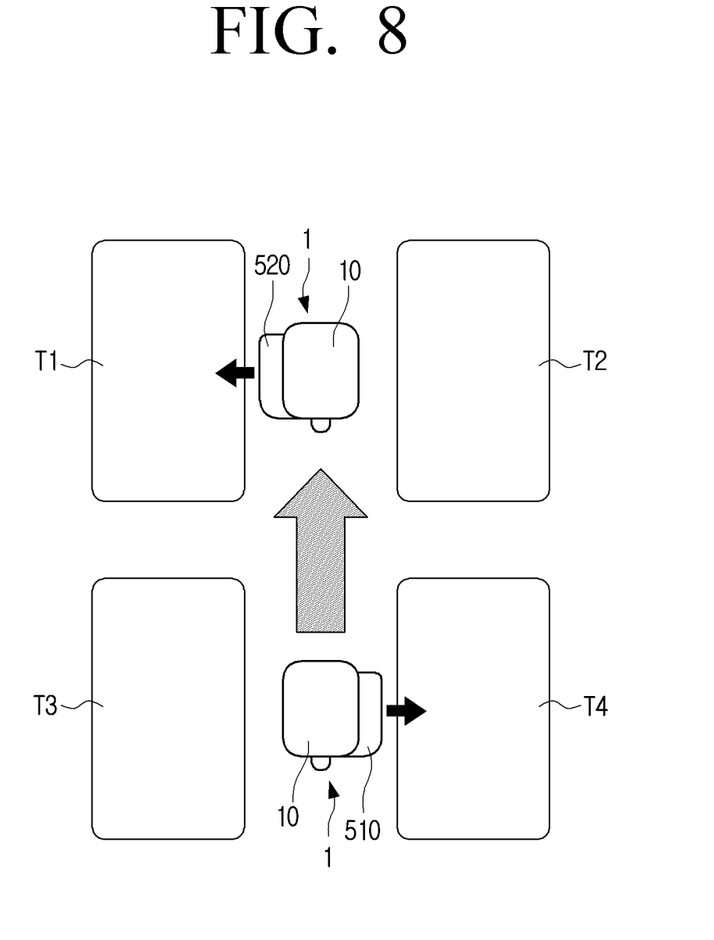
FIG. 8 is a diagram illustrating a state in which the serving robot apparatus performs a serving operation.

FIG. 7 is a block diagram schematically illustrating a control process of a serving robot apparatus according to one or more embodiments of the disclosure; FIG. 8 is a diagram illustrating a state in which the serving robot apparatus performs a serving operation.

Referring to FIG. 7, the serving robot apparatus 1 may further include a processor 900 and an input device 1000 for diversely controlling the operation of the serving robot apparatus 1.

The processor 900 may control the overall operation of the serving robot apparatus 1. The processor 900 may include one or more of a central processing unit (CPU), an application processor (AP), and a communication processor (CP). The processor 900 may be a micro control unit (MCU).

The processor 900 may control hardware or software components connected to the processor 900 by driving an operating system or application program. The processor 900 may also perform various data processing and operations. The processor 900 may load or process commands or data received from at least one of the other components into the volatile memory and store the various data in a non-volatile memory.

The input device 1000 may include, for example, at least one of a touch panel, a (digital) pen sensor, a key, or an ultrasonic input device. The touch panel, pen sensor, and key may be provided in the display device 14.

The touch panel may be used in relation to, for example, at least one of an electrostatic, a pressure-sensitive, infrared, or ultrasonic manner, and the touch panel may further include a control circuit. The touch panel may further include a tactile layer to provide a tactile response to the user. The (digital) pen sensor may, for example, be part of a touch panel or include a separate recognition sheet. The key may include, for example, a physical button, an optical key, or a keypad. The ultrasonic input device may, for example, detect ultrasonic wave generated from an input tool and confirm data corresponding to the detected ultrasonic wave.

The input device 1000 may be a terminal device such as a remote controller, a smart watch, a smart band, a wireless headset, a mobile phone, a smart phone, a tablet, or the like.

The user may input location information and plate information to the input device 1000, and the input device 1000 may transmit the location information and the plate information inputted from the user to the processor.

The location information relates to a destination at which the serving robot apparatus 1 is to arrive, and may be related to a target location on which the subject for serving is to be carried. For example, the location information may be a table location where food is to be served in a restaurant.

Plate information may be related to any one of the plurality of plates 500 and the base plate 13. For example, the plate information may be related to a plate in which food corresponding to a table location in a restaurant is located.

That is, the user may input the location information and the plate information so that the designated food may be served to a designated table in the restaurant.

More specifically, when location information and plate information are inputted by a user, the processor 900 may control the first driving device 700 to move the main body 10 to a location corresponding to the location information. Accordingly, the serving robot apparatus 1 may move to an input location (for example, a specific table in a restaurant).

In addition, the processor 900 may control the second driving device 800 such that at least one of the plurality of plates 500 moves based on the plate information. Accordingly, the designated plate may be withdrawn from the main body 10 according to the inputted plate information so that the user can easily pick up the subject for serving.

Referring to FIG. 8, first to fourth tables T1, T2, T3, and T4 may be disposed in a restaurant, and a passage through which the serving robot apparatus 1 may move may be formed between the first and second tables T1 and T2 and the third and fourth tables T3 and T4.

For example, a user may input first location information (for example, a fourth table T4) and first plate information (for example, a first plate 510) through the input device 1000, and input second location information (for example, a first table T1) and second plate information (for example, a second plate 520).

The processor 900 may control the first and second driving devices 700, 800 based on the input first location information, the first plate information, the second location information, and the second plate information.

First, the processor 900 may control the first driving device 700 so that the main body 10 moves to the fourth table T4. Thereafter, the processor 900 may control the second driving device 800 so that the first plate 510 moves to the right side toward the fourth table T4. The user sitting at table T4 would then remove the subject for serving (food) on the first plate 510.

Next, the processor 900 may control the first driving device 700 such that the main body 10 moves to the first table T1. Thereafter, the processor 900 may control the second driving device 800 so that the second plate 520 moves to the left toward the first table T1.

Through the control process of the processor 900 described above, the serving robot apparatus 1 may correctly and sequentially deliver the subject for serving to a designated location.

In addition, since the plurality of plates 500 may move to the left or right with respect to the main body 10, the serving robot apparatus 1 may deliver the subject for serving within a short time to a path optimized to the first and fourth tables T1 to T4 arranged on the opposite side with respect to the main body 10 even if the serving robot apparatus 1 rotates within the passage or moves away from the narrow passage to a wide place and does not re-enter the passage after U-turn.

Figure 9:
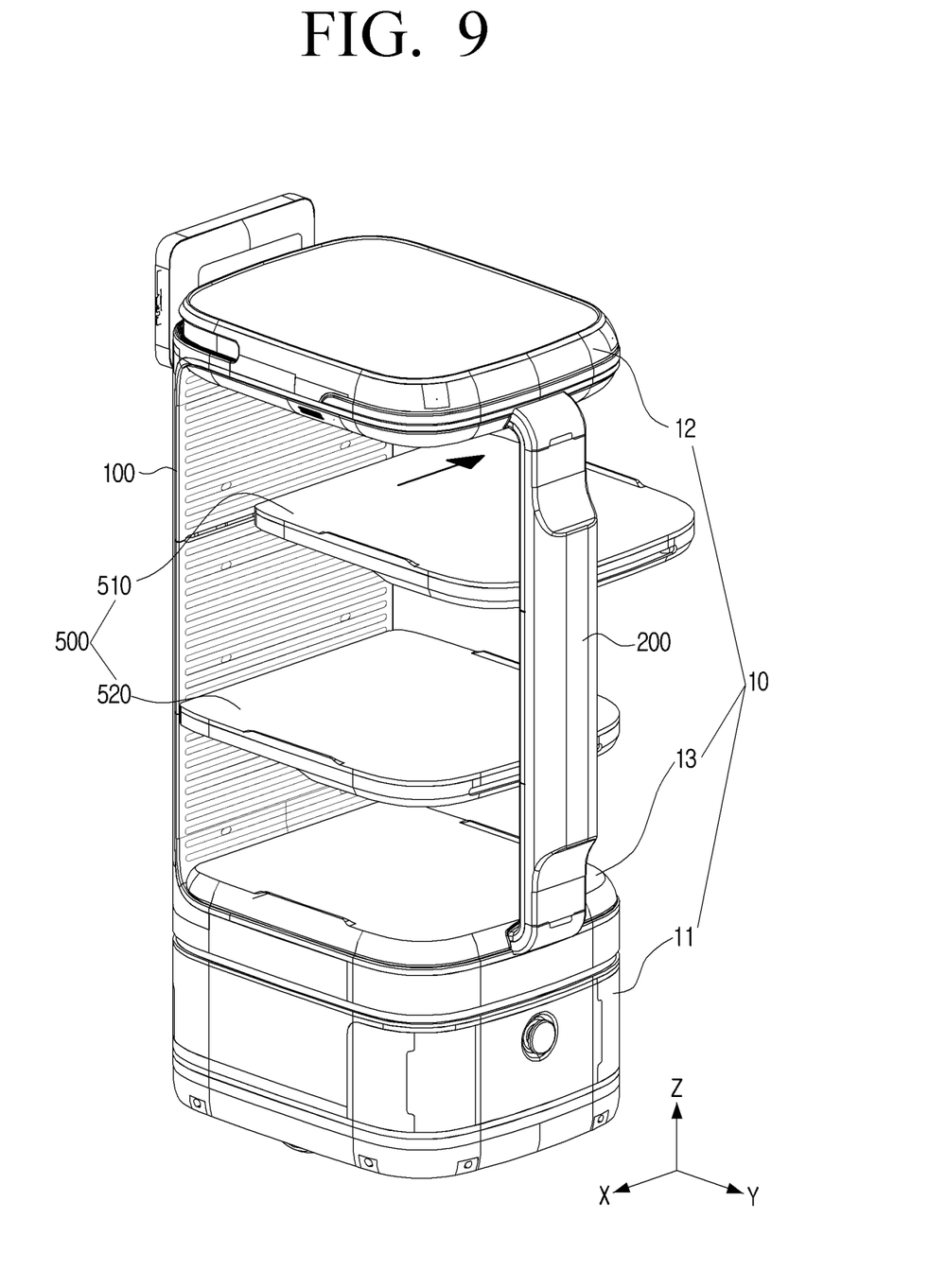
FIGS. 9 to 11 are views illustrating a process of controlling movement of a plate according to plate information input by a user.
Figure 10:
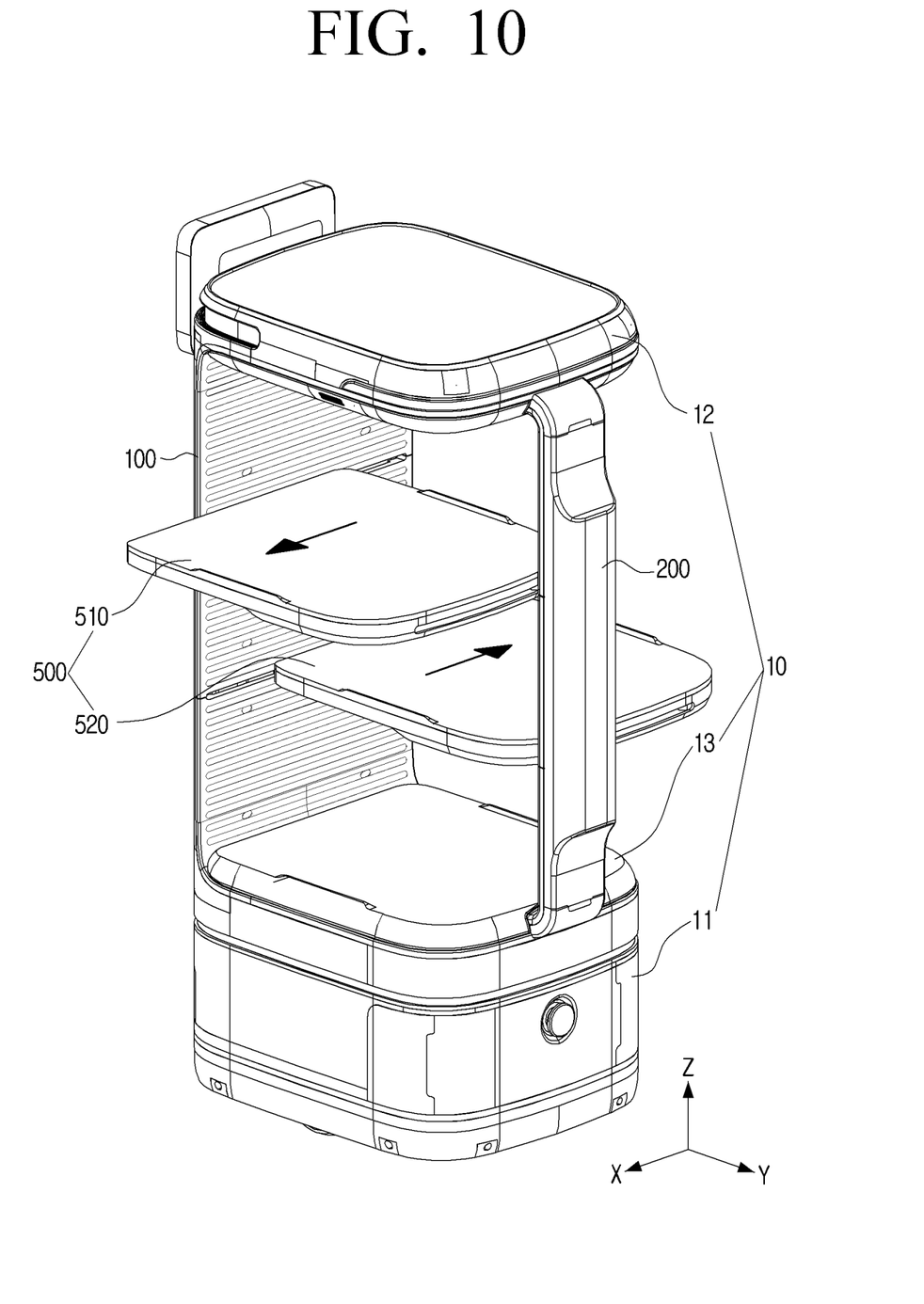
Figure 11:
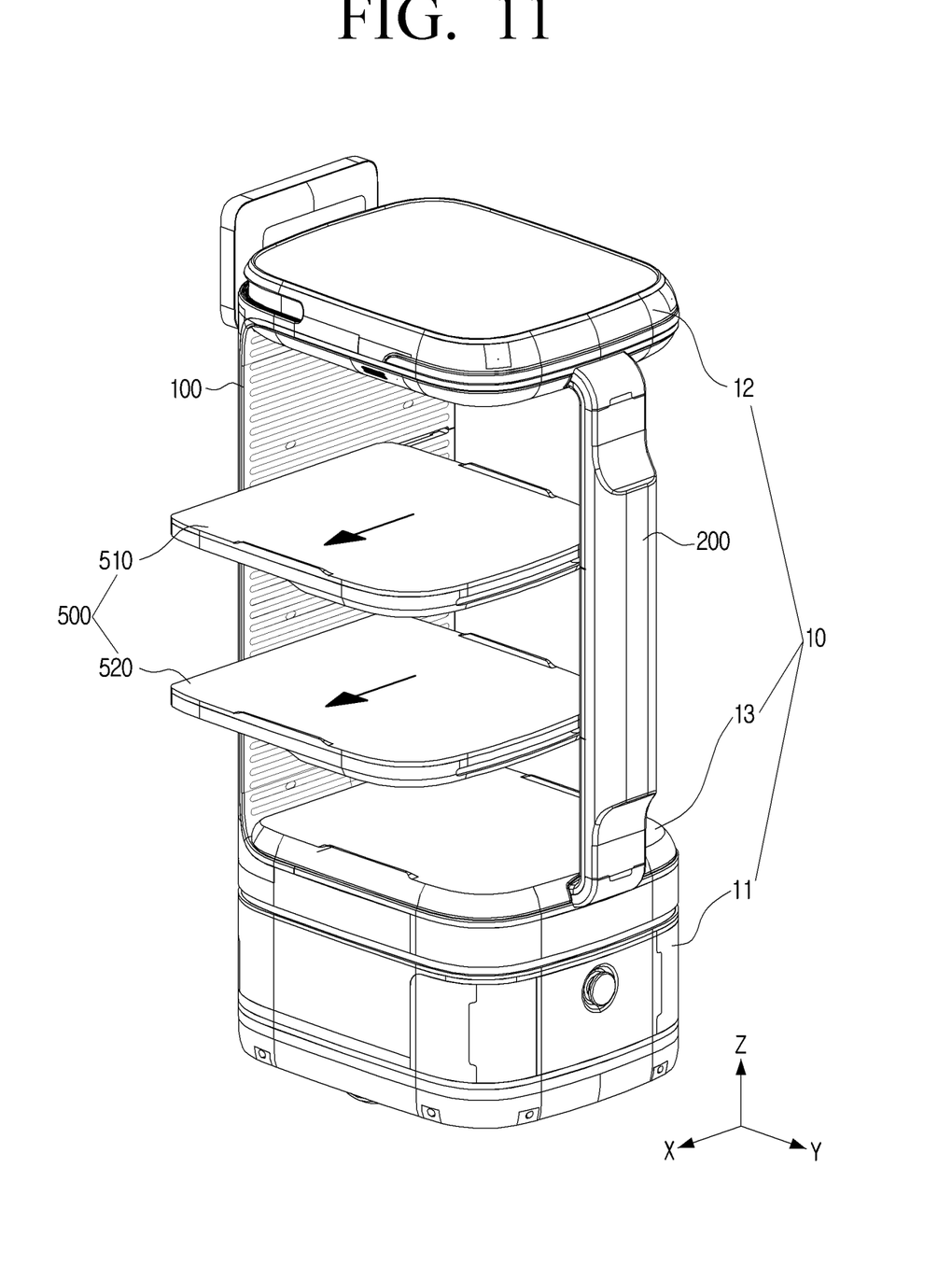

FIGS. 9 to 11 are views illustrating a process of controlling movement of a plate according to plate information input by a user.

Referring to FIG. 9, when it is determined that plate information input by a user corresponds to the first plate 510, the processor 900 may control the second driving device 800 to move the first plate 510 toward the target location.

That is, when the subject for serving is placed on the first plate 510, the first plate 510 may move towards the user to be served. Here, since the first plate 510 is disposed at the uppermost side of the plurality of plates 500, the first plate 510 may not be interfered with the other plates.

Thereafter, when the user picks up the subject for serving placed on the first plate 510, the processor 900 may control the second driving devices 800 so that the first plate 510 moves in the opposite direction again and returns to the original place.

Referring to FIG. 10, when it is determined that the plate information corresponds to the second plate 520, the processor 900 may control the second driving device 800 such that the first plate 510 moves in a first direction (+X direction) and the second plate 520 moves in a second direction (−X direction) opposite to the first direction.

That is, if the subject for serving is placed on the second plate 520, the second plate 520 may move towards the served user. Here, since the first plate 510 is disposed on the upper side of the second plate 520, the first plate 510 may be moved in the opposite direction to the second plate 520 because the first plate 510 may interfere with the pick-up operation of the user. Accordingly, since the subject for serving placed on the second plate 520 is exposed to the outside as much as possible without being covered by the first plate 510, the user may easily pick up the subject for serving placed on the second plate 520.

Thereafter, when the user picks up the subject for serving placed on the second plate 520, the processor 900 may control the second driving devices 800 so that the first and second plates 510, 520 move in the opposite direction again and return to the original location.

Referring to FIG. 11, when it is confirmed that the plate information corresponds to the base plate 13, the processor may control the second driving device 800 to move the first and second plates 510, 520 in the same direction.

Specifically, when a subject for serving is placed on the base plate 13, since the first and second plates 510, 520 are arranged on the upper side of the base plate 13, it is possible to interrupt the pick-up operation of the user. Accordingly, the first and second plates 510, 520 may move in the same direction (+X direction or −X direction), and the subject for serving placed on the base plate 13 is exposed to the outside as much as possible without being covered by the first and second plates 510, 520, so that a user may easily pick up a subject for serving placed on the base plate 13.

Thereafter, if the user picks up the subject for serving placed on the base plate 13, the processor 900 may control the second driving device 800 so that the first and second plates 510, 520 move in the opposite direction again and return to the original place. The serving robot apparatus 1 then may activate the first driving device 700 to move away from the table.

Although the disclosure has been described above with respect to a preferred embodiment of the disclosure above, the disclosure is not limited to the specific embodiments described above, but various modifications may be implemented by a person skilled in the art to which the disclosure belongs without departing from the subject matter of the disclosure claimed in the claims, and such changes are within the scope of the claims.

What is claimed is:

1. A serving robot apparatus comprising:
    a main body;
    a first driving device configured to move the main body;
    a first sidewall and a second sidewall supported by the main body, wherein the first sidewall has one surface disposed to face one surface of the second sidewall;
    a plurality of guide rails horizontally disposed on the one surface of the first sidewall and spaced apart from each other in a vertical direction;
    a plurality of link members, wherein a first end of each of the plurality of link members is rotatably connected to the one surface of the second sidewall;
    a plurality of plates, wherein a first side of each of the plurality of plates is connected to an intermediate region of a respective one of the plurality of guide rails, and a second side, opposite to the first side, of each of the plurality of plates is connected to a second end, opposite to the first end, of a respective one of the plurality of link members; and
    at least one second driving device configured to rotate the plurality of link members so that the plurality of plates respectively move along the plurality of guide rails.

2. The serving robot apparatus of claim 1, wherein a link member from among the plurality of link members comprises:
    a first link, wherein one end of the first link is rotatably connected to the second sidewall, and
    a second link which is slidably connected to the first link, the second link comprising an end that is away from the first link and is connected to a plate from among the plurality of plates.

3. The serving robot apparatus of claim 2, wherein the second link is disposed on an upper side of the first link and the end of the second link is connected to a lower surface of the plate.

4. The serving robot apparatus of claim 2, further comprising:
    a support member comprising an upper surface and a lower surface,
    wherein the upper surface of the support member is disposed to face a lower surface of the plate, and the lower surface of the support member is disposed to face the first link.

5. The serving robot apparatus of claim 4, wherein the support member is disposed side by side with a guide rail from among the plurality of guide rails.

6. The serving robot apparatus of claim 1, wherein the second sidewall has a width smaller than a width of the first sidewall.

7. The serving robot apparatus of claim 1, further comprising:
a plurality of guide blocks respectively connected to the second side of the plurality of plates and movable along the plurality of guide rails, respectively.

8. The serving robot apparatus of claim 7, wherein a guide block from among the plurality of guide blocks has a width between 0.1 times and 0.4 times a width of a guide rail from among the plurality of guide rails.

9. The serving robot apparatus of claim 1, wherein the plurality of plates comprises:
a first plate; and
a second plate disposed below the first plate,
wherein the main body comprises a base plate horizontally disposed on a lower side of the second plate.

10. The serving robot apparatus of claim 1, further comprising:
a processor configured to, based on location information and plate information being input by a user, control the first driving device to move the main body to a location corresponding to the location information, and control the at least one second driving device to move at least one of the plurality of plates based on the plate information.

11. The serving robot apparatus of claim 10, wherein the plurality of plates comprise:
a first plate; and
a second plate disposed below the first plate,
wherein the processor is further configured to, based on identifying that the plate information corresponds to the second plate, control the at least one second driving device so that the first plate moves in a first direction and the second plate moves in a second direction opposite to the first direction.

12. The serving robot apparatus of claim 11, wherein the main body comprises a base plate horizontally disposed on the lower side of the second plate,
wherein the processor is further configured to, based on identifying that the plate information corresponds to the base plate, control the at least one second driving device so that the first plate and the second plate move in a same direction.

13. The serving robot apparatus of claim 1, further comprising:
a camera configured to capture a surrounding environment of the serving robot apparatus.

14. The serving robot apparatus of claim 1, wherein the main body further comprises:
a first body that supports a lower end of the first sidewall and a lower end of the second sidewall; and
a second body that supports an upper end of the first sidewall and an upper end of the second sidewall.

15. The serving robot apparatus of claim 14, further comprising:
a display device disposed in the second body.

16. The serving robot apparatus of claim 1, wherein the plurality of plates are at least partially within a space defined by and between the main body, the first sidewall, and the second sidewall, and
wherein the plurality of plates are between the first sidewall and the second sidewall in a first horizontal direction.

17. The serving robot apparatus of claim 16, wherein the plurality of plates are configured to:
respectively move along the plurality of guide rails in a second horizontal direction, crossing the first horizontal direction, such that at least a first portion of the plurality of plates leaves the space in the second horizontal direction; and
respectively move along the plurality of guide rails in a third horizontal direction, opposite to the second horizontal direction, such that at least a second portion of the plurality of plates leaves the space in the third horizontal direction.

* * * * *